(12) United States Patent
Matsui et al.

(10) Patent No.: US 6,297,865 B1
(45) Date of Patent: Oct. 2, 2001

(54) LIQUID CRYSTAL ELEMENT HAVING POLARIZATION MODERATING PROPERTIES

(75) Inventors: Eriko Matsui; Nobue Kataoka; Takashi Iwamura; Hidehiko Takanashi; Akio Yasuda, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/037,757

(22) Filed: Mar. 10, 1998

(51) Int. Cl.[7] .......................... G02F 1/1337; G02F 1/141
(52) U.S. Cl. ..................... 349/123; 349/125; 349/135; 349/133
(58) Field of Search .................................. 349/133, 123, 349/172, 125, 135

(56) References Cited

U.S. PATENT DOCUMENTS

| 5,231,523 | * | 7/1993 | Nakaya et al. ................... 349/133 |
| 5,427,829 | * | 6/1995 | Mochizuki et al. .............. 349/133 |
| 5,654,784 | * | 8/1997 | Yasuda et al. .................... 349/172 |
| 6,040,884 | * | 3/2000 | Yasuda et al. .................... 349/133 |

FOREIGN PATENT DOCUMENTS 5-262951   5/1919   (JP) .

OTHER PUBLICATIONS

Ferroelectric Liquid Crystal, Robert B. Meyer, 1977, Md. Crys. Liq. Cryst. vol. 40, pp. 33–48.
Submicrosecond Bistable Electro–optic Switching in Liquid Crystals, Noel A. Clark and Sven T. Lagerwall; 1980, Appl. Phys. Lett., pp. 899–901.

* cited by examiner

Primary Examiner—Toan Ton
(74) Attorney, Agent, or Firm—Ronald P. Kananen; Rader, Fishman & Grauer

(57) ABSTRACT

A liquid crystal element improved to reduce hysteresis and after-image by relaxing electronic polarization at an interface between liquid crystal and an orientation film, and hence to enhance an image quality and realize smooth display of a dynamic image irrespective of a material of liquid crystal. The liquid crystal element includes a plurality of base bodies each having a liquid crystal orientation film, the base bodies being opposed to each other on the orientation film side with a specific gap put therebetween; and liquid crystal disposed in the gap; wherein each of the orientation films has a property capable of relaxing polarization at an interface with the liquid crystal. The liquid crystal orientation film may be composed of an orientation film having low polarization such as a SiOx oblique vapor-deposition film or may be composed of a stacked film in which a thin film having low polarization and capable of relaxing polarization at an interface with the liquid crystal or an organic complex having an electric conductivity of $1.2 \times 10^{-8}$ S/cm or more is stacked on an orientation film.

6 Claims, 14 Drawing Sheets

FIG. 5
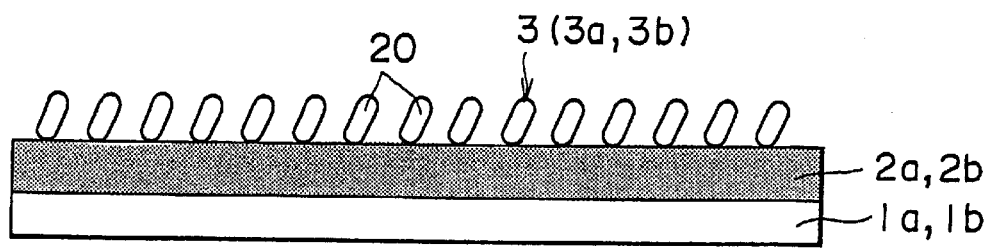
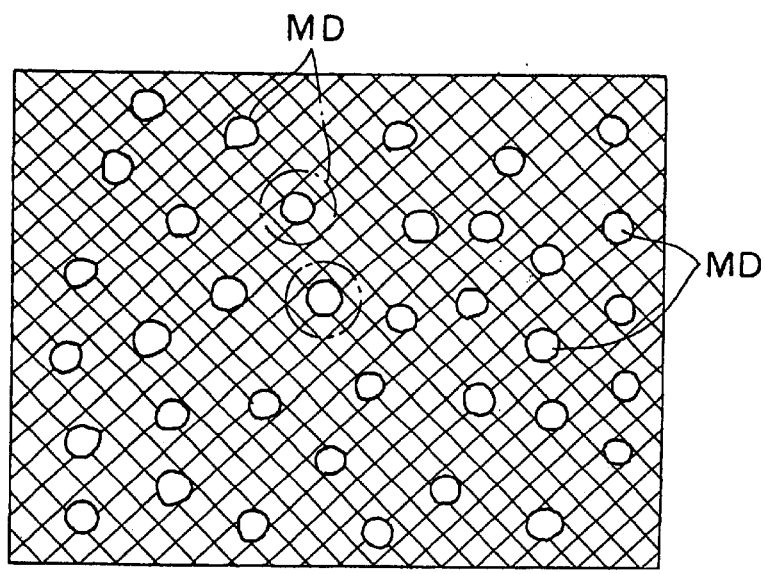
FIG. 6A
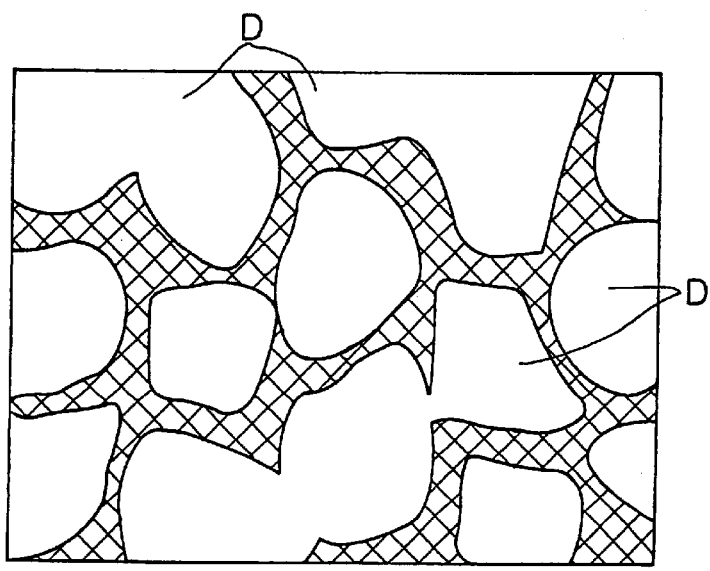
FIG. 6B $$d_1 + d_2 = d\,gap$$

$$E_{eff} = \frac{\varepsilon_2}{\varepsilon_1 d_2 + \varepsilon_2 d_1} \times V\,gap \cdots\cdots (1)$$

$\varepsilon_1$ : DIELECTRIC CONSTANT OF LIQUID CRYSTAL
$\varepsilon_2$ : DIELECTRIC CONSTANT OF ADDED FINE PARTICLE Ps eff = Ps cos δ

HYSTERESIS OF (SiO OBLIQUE VAPOR-DEPOSITION FILM + POLYVINYL ALCOHOL FILM)

TTF

TCNQ

LIQUID CRYSTAL ELEMENT HAVING POLARIZATION MODERATING PROPERTIES

BACKGROUND OF THE INVENTION

The present invention relates to a liquid crystal element (for example, a liquid crystal display element or a liquid crystal display) in which a plurality of base bodies each having a liquid crystal orientation film are opposed to each other on the liquid crystal orientation film side with a specific gap put therebetween.

A liquid crystal display (LCD) using liquid crystal as a display element, having a feature allowing a low power consumption with a thin and lightweight structure, is being applied to watches, electronic calculators, computer displays, and television receivers (TVs).

Researches and developments have been actively made to use ferroelectric liquid crystal (FLC) as the above liquid crystal for LCDS. Ferroelectric liquid crystal was first synthesized by R. B. Meyer in 1975, and a surface-stabilized ferroelectric liquid crystal enabling domain inversion by an applied electric field was invented by N. A. Clark and S. T. Lagerwall in 1980. FLC is a liquid crystal whose molecules themselves have permanent dipole moments perpendicular to major axes of the molecules, that is, it has a spontaneous polarization switchable by an applied electric field. A display using FLC has the following excellent features (1) to (3).

(1) The FLC display has a switching speed in the order of $\mu$sec, that is, it exhibits a high speed of response being as high as 1,000 times that of a twisted nematic (TN) liquid crystal display.

(2) The FLC display has a molecular arrangement basically containing no twist structure, and thereby it has less dependency on angle of visibility.

(3) The FLC display holds an image after turn-off of a power supply, that is, stores an image, and thereby it allows a simple matrix drive to be adopted for scanning lines of 1,000 lines or more capable of being matched with definition display.

The FLC display is thus expected to meet demands toward high definition, low cost, and large screen.

Such a FLC display (ferroelectric liquid crystal display element) has a structure typically shown in FIGS. 15 and 16. Transparent electrodes 2a and 2b made from ITO (Indium Tin Oxide) of 100 $\Omega/\square$ are provided on transparent substrates 1a and 1b made of glass (Corning Code 7059, 0.7 mm thick), respectively. Each transparent electrode is patterned into a stripe pattern by etching. To be more specific, the transparent electrode 2a are patterned into data electrodes (column electrodes) 2a, and the transparent electrode 2b is patterned into scanning electrodes (row electrodes) 2b. The data electrodes 2a and the scanning electrodes 2b are disposed in such a manner as to cross each other in a matrix.

Liquid crystal orientation films 3a and 3b, represented by oblique vapor-deposition films of SiO, are formed on the transparent electrodes 2a and 2b, respectively. In formation of the oblique vapor-deposition film of SiO, a substrate is disposed obliquely downward from a SiO vapor-deposition source in a vacuum vapor-deposition system. In this case, a deposition angle between a line connecting the vapor-deposition source to the substrate and the normal line of the substrate is set at 85°. The vapor-deposition film of SiO formed on the substrate at a substrate temperature of 170° C. is then baked at 300° C. for 1 hr.

A pair of the substrates 1a and 1b with the orientation films thus prepared are assembled to be opposed to each other on the orientation film side in such a manner that the orientation-treatment direction of the film on the data electrode 2a side is anti-parallel to that of the film on the scanning electrode 2b side, and that the arrangement of the data electrodes 2a is perpendicular to that of the scanning electrodes 2b. As spacers, there are used glass beads 4 having sizes corresponding to a target gap length, for example, glass beads shinshikyu, diameter in a range of 0.8 to 3.0 $\mu$m, produced by Catalysts $ Chemicals Industries Co., Ltd.). Although in the example shown in the figures, the orientation-treatment directions of the opposed films are set to be anti-parallel to each other, they may be set to be parallel to each other.

The setting of the spacers 4 is dependent on sizes of the transparent substrates 1a and 1b. In the case where the substrate area is small, a gap between the substrates is adjusted by dispersing about 0.3 wt % of the spacers 4 in a sealing material 6 [UV hardened type adhesive (Photolec, produced by Sekisui Chemical Co., Ltd.) for bonding peripheries of the substrates. In the case where the substrate area is large, the above shinshikyu, are scattered between the substrates at an average density of 100 pieces/mm$^2$, followed by adjustment of a gap between the substrates, and peripheries of the substrates constituting a cell are bonded by the sealing material 6 with a liquid crystal injection hole being ensured.

As liquid crystal to be injected between the substrates 1a and 1b, there is typically used a liquid crystal composition in which ferroelectric liquid crystal (YS-C152, produced by Chisso Corporation) 5 is homogeneously dispersed at an isotropic phase temperature using a ultrasonic homogenizer. This ferroelectric liquid crystal composition is injected under a reduced pressure at a temperature allowing the liquid crystal to exhibit a fluidity, such as an isotropic phase temperature or a chiral nematic phase temperature. The liquid crystal thus injected is gradually cooled, followed by removal of an unnecessary portion of the liquid crystal adhering on the glass substrates around the injection hole, and the cell is sealed using an epoxy based adhesive, to thus prepare a FLC display 11.

The FLC display 11 is driven by an X-Y matrix system. In the case of using an NTSC system, 1 H (one horizontal scanning time or one selecting time) is set at 63.5 $\mu$s, and since a voltage is applied using a bipolar manner in consideration of electrically neutral condition, each selection pulse becomes 63.5/2 $\mu$s in width. A select pulse as a threshold value is applied from the row side (electrodes 2b), and a data pulse is applied from the column side (electrodes 2a).

In a ferroelectric liquid crystal element (for example, surface-stabilized ferroelectric liquid crystal element), the orientation of a molecule M is switched between states 1 and 2 shown in FIG. 17 when an electric field E is applied thereto from the exterior. In addition, character Ps indicates a spontaneous polarization. A change in orientation of the molecule M can be converted into a change in transmittance by provision of the liquid crystal element between polarizer sheets disposed perpendicularly to each other. Such a transmittance is rapidly changed depending on the applied electric field, for example, as shown in FIG. 18, it is rapidly changed from 0% to 100% at a threshold voltage V$_{th}$. A voltage width in which the transmittance is changed is generally in a range of 1 V or less.

In this way, in the related art ferroelectric liquid crystal display using the bi-stable mode, only the two states are stable, and accordingly, it is difficult to give a stable voltage width to a curve between a transmittance and an applied voltage. In other words, it is difficult or impossible to attain gradation display by voltage control.

The present applicant has studied to solve such an inconvenience and found that an analog gradation display can be achieved by giving a distribution of an effective field strength applied to liquid crystal in one pixel so as to extend a width of threshold voltages for switching between bi-stable states of the liquid crystal in the one pixel, and has already proposed a technique in Japanese Patent Laid-open No. Hei 5-262951 (hereinafter, referred to as "earlier invention").

According to the earlier invention, to achieve the above-described subject "to extend a width of threshold voltages", there is adopted a method of adding and dispersing ultra-fine particles of titanium oxide or the like in ferroelectric liquid crystal.

By addition of the ultra-fine particles in the liquid crystal, micro-domains different in threshold voltage ($V_{th}$) appear in one pixel. Since transmittances of the micro-domains are individually changed depending on magnitudes of an applied voltage, the total transmittance of the liquid crystal is changed not rapidly but relatively moderately depending on the magnitudes of the applied voltage, thus enabling analog gradation display. Further, since bi-stable molecules of the liquid crystal have a memory function in one domain and one pixel is formed of these domains (in the order of $\mu$m) different in threshold voltage, it is possible to achieve continuous gradation display.

Accordingly, for the liquid crystal element disclosed in the earlier invention, the transmittance is not rapidly changed depending on an applied voltage as shown in FIG. 18 but is relatively moderately changed depending on an applied voltage as shown in FIG. 19. The reason for this is that, as described above, for the liquid crystal disclosed in the earlier invention, since the transmittances of the micro-domains different in threshold value ($V_{th}$) appearing in one pixel are individually changed depending on magnitudes of an applied voltage, the total transmittance of the liquid crystal in one pixel is relatively moderately changed depending on the magnitudes of the applied voltage. Further, since bi-stable molecules of the liquid crystal have a memory function in one domain and one pixel is formed of these domains (in the order of $\mu$m) different in threshold voltage, it is possible to achieve continuous gradation display.

With respect to the above-described ferroelectric liquid crystal element, however, the present inventor has found that such an element exhibiting the above-described excellent characteristics causes an applied voltage-transmittance hysteresis phenomenon and an after-image phenomenon due to a bipolar moment and a dielectric constant of molecules of the ferroelectric liquid crystal and ions of an impurity in a panel. Here, the hysteresis phenomenon means a phenomenon in which the transmittance is not determined at one value depending on a voltage applied at the previous frame, and the after-image phenomenon means a phenomenon in which a display color selected at the previous frame remains.

In a usual monochromatic ferroelectric liquid crystal display, the above hysteresis and after-image cause problems that if the same image is continuously displayed for a long time, the next image cannot be displayed, and that with the increased power consumption, the drive system is complicated. In particular, in the ferroelectric liquid crystal display of a type containing ultra-fine particles for allowing analog gradation display, in addition to the above disadvantages (hysteresis and after-image), there may occur instability of gradation display color, which makes it difficult to make full use of the advantage of the gradation display of the liquid crystal of this type.

As a result of examination of the above-described hysteresis and after-image, it has been found that one cause of hysteresis and after-image is due to polarization (particularly, electronic polarization) of an orientation film at an interface between liquid crystal and the orientation film generated upon switching of the spontaneous polarization which is a feature of ferroelectric liquid crystal. Such a phenomenon will be described in detail below.

The applied voltage-transmittance hysteresis can be evaluated by measuring a transmittance curve in a condition that an applied voltage is gradually increased and another transmittance curve in a condition in which an applied voltage is gradually decreased, and obtaining a deviation (voltage width) between the two transmittance curves. For example, such a deviation is equivalent to H$\Delta$V shown in FIG. 20. Values of transmittance depending on applied random voltages used for usual image display lie between the two transmittance curves in FIG. 20, and consequently, instability of display color is dependent on a magnitude (H$\Delta$V) of hysteresis.

Accordingly, by eliminating such a voltage width (H$\Delta$V= 0), it becomes possible to eliminate an effect of the applied voltage at the previous frame, that is, to select a transmittance at one value only depending on the present magnitude of an applied voltage.

The after-image phenomenon is a phenomenon that in the case of monochromatic display using a usual ferroelectric liquid crystal display, when a voltage (V1 in FIG. 21) for displaying white is applied at a frame next to the previous frame in which black is displayed, black is actually displayed. of course, the reversed phenomenon may occur at the next frame where it is intended to display white. When viewed as the entire display, the image at the previous frame is distortedly seen as a residual image.

This after-image phenomenon appears more significantly in a ferroelectric liquid crystal display of a type containing ultra-fine particles for allowing analog gradation display. To be more specific, since such an after-image phenomenon appears when gray is displayed, as shown in FIG. 22, not only a deviation (H$\Delta$V) is present between the curves but also the curve itself is deformed in a $\gamma$-shape. For example, in FIG. 22, although a pattern with a thin color is intended to be displayed in a pattern with a dense color at an applied voltage V2, there is a possibility that a relationship in color between the patterns is reversed. Further, there may occur an unnatural display of a dynamic image. In addition, the after-image can be evaluated by use of a value of Y$\Delta$V as a comparison factor in curves (shown in FIG. 21) which are measured in the same manner as that for obtaining the curve s used to evaluate the hysteresis.

By eliminating these values H$\Delta$V and Y$\Delta$V, it is possible to reduce a value V3 of a data voltage inputted from the column side of a simple matrix and obtain a smooth dynamic image in a usual ferroelectric liquid crystal display, and also it is possible to accomplish a perfect analog gradation display in a ferroelectric liquid crystal display of a type containing ultra-fine particles.

SUMMARY OF THE INVENTION

An object of the present invention is to provide a liquid crystal element capable of reducing the above-described hysteresis and after-image, thereby improving an image quality and realizing smooth display of a dynamic image.

To achieve the above object, according to a first aspect of the present invention, there is provided a liquid crystal element including: a plurality of base bodies each having a liquid crystal orientation film, the base bodies being opposed to each other on the orientation film side with a specific gap put therebetween; and liquid crystal disposed in the gap; wherein each of the orientation films has a property capable of moderating polarization at an interface with the liquid crystal.

The above liquid crystal orientation film may be composed of an oblique vapor-deposition film of SiOx (x is a positive number less than 2) in which a bond energy of a 2P orbital of Si is 103.3 eV or less.

The liquid crystal orientation film may be composed of a stacked film in which a thin film having a property capable of moderating polarization at an interface with the liquid crystal is stacked on an orientation film. The thin film capable of moderating polarization preferably has an electric conductivity of 2.0 S/cm or less, or $1.2 \times 10^{-8}$ S/cm or more.

According to a second aspect of the present invention, there is provided a liquid crystal element including: a plurality of base bodies each having a liquid crystal orientation film, the base bodies being opposed to each other on the orientation film side with a specific gap put therebetween; and liquid crystal disposed in the gap; wherein an organic complex having an electric conductivity of $1.2 \times 10^{-8}$ S/cm or more is stacked on a liquid crystal orientation film.

According to a third aspect of the present invention, there is provided a liquid crystal element including: a plurality of base bodies each having a liquid crystal orientation film, the base bodies being opposed to each other on the orientation film side with a specific gap put therebetween; and liquid crystal disposed in the gap; wherein the liquid crystal orientation film is composed of a stacked film in which a thin film having a property being low in polarization at an interface with the liquid crystal is stacked on an orientation film.

According to a fourth aspect of the present invention, there is provided a liquid crystal element including: a plurality of base bodies each having a liquid crystal orientation film, the base bodies being opposed to each other on the orientation film side with a specific gap put therebetween; and liquid crystal disposed in the gap; wherein the liquid crystal orientation film is composed of a stacked film in which a high polymer thin film is stacked on an orientation film. In this element, the high polymer thin film preferably has a property being low in polarization at an interface with the liquid crystal.

In the above liquid crystal elements described in the first, second, third and fourth aspects of the present invention, preferably, liquid crystal is composed of ferroelectric liquid crystal in which domains different in threshold voltage for switching the ferroelectric liquid crystal are finely distributed, and fine particles are added in the ferroelectric liquid crystal for forming micro-domains different in threshold voltage.

According to the present invention having the above configuration, it is possible to reduce hysteresis and after-image by relaxing polarization, particularly, electronic polarization of an orientation film at an interface between liquid crystal and the orientation film, and hence to enhance an image quality and realize smooth display of a dynamic image irrespective of a liquid crystal material and fine particles added in the liquid crystal.

BRIEF DESCRIPTION OF THE DRAWINGS

FIG. 5 is a schematic sectional view showing an essential portion of the liquid crystal element in the example, particularly showing the SiO oblique vapor-deposition film;

FIGS. 6A and 6B are schematic views illustrating a generation state of domains upon drive of the liquid crystal element in the example in comparison with a related art element;

FIG. 8, having

DETAILED DESCRIPTION OF THE INVENTION

Figure 1:
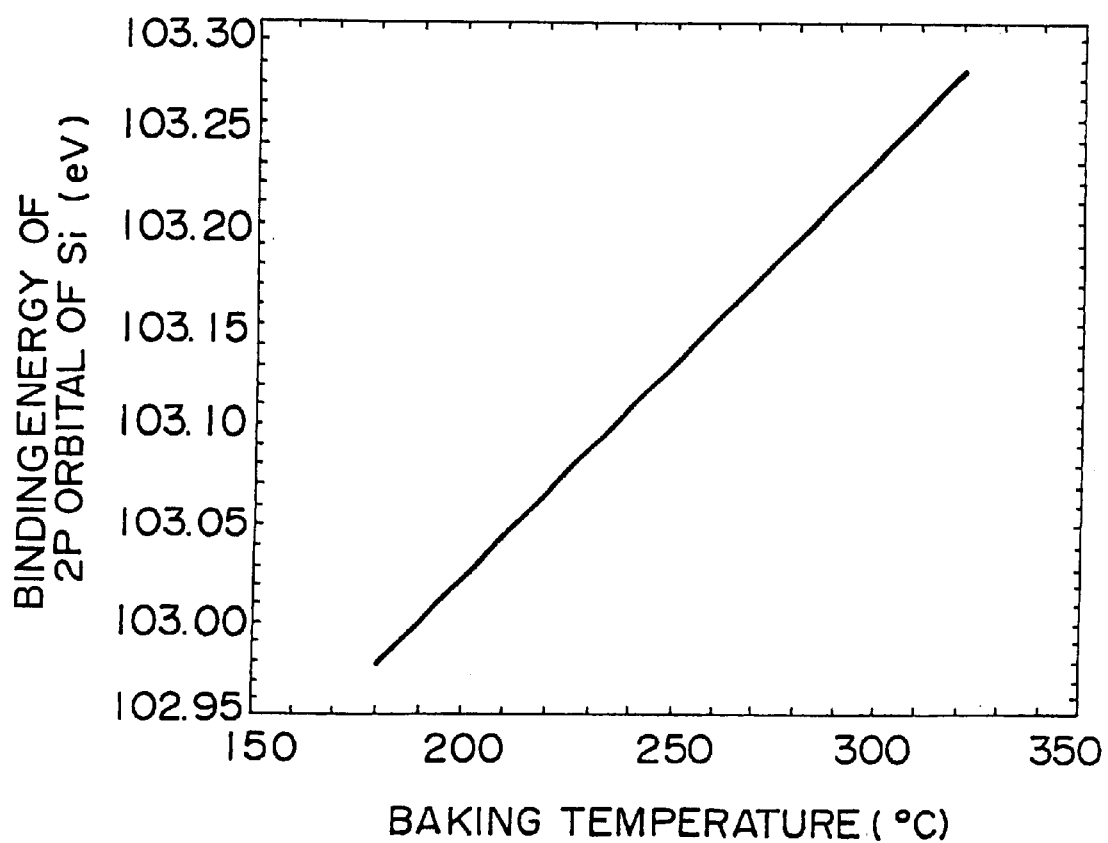
FIG. 1 is a graph showing a relationship between a baking temperature of a SiO oblique vapor-deposition film of a liquid crystal element in an example of the present invention and a bond energy of a 2P orbital of Si.

The present inventor has found that the cause of the above hysteresis and after-image is due to electronic polarization of an orientation film at an interface between liquid crystal and the orientation film generated upon drive of liquid crystal and consequently an image quality can be improved and smooth display of a dynamic image can be realized by relaxing the electronic polarization, and has accomplished the present invention.

Accordingly, the present invention relates to a liquid crystal element including: a plurality of base bodies each having a liquid crystal orientation film, the base bodies being opposed to each other on the orientation film side with a specific gap put therebetween; and liquid crystal disposed in the gap; wherein the orientation film is composed of an orientation film having a property capable of moderating polarization at an interface with the liquid crystal, particularly, an orientation film having a high electric conductivity.

According to this liquid crystal element, it is possible to moderate polarization, particularly, electronic polarization of the orientation film at an interface between the liquid crystal and the orientation film generated upon drive of the liquid crystal, which polarization is considered as the major cause of the hysteresis and after-image, and hence to reduce the above hysteresis (H$\Delta$V) and the like. As a result, it is possible to improve an image quality and realize smooth display of a dynamic image irrespective of a material of the liquid crystal.

The above liquid crystal orientation film is preferably composed of an oblique vapor-deposition film of SiOx (x: a positive number less than 2) in which a bond energy of a 2P orbital of Si is 103.3 eV or less. Since SiOx is active more than $SiO_2$ and exhibits an electric conductivity, electric charges in the orientation film at the interface with the liquid crystal is effectively discharged through SiOx, to thereby reduce the polarization phenomenon.

The present invention also provides a liquid crystal element including: a plurality of base bodies each having a liquid crystal orientation film, the base bodies being opposed to each other on the orientation film side with a specific gap put therebetween; and liquid crystal disposed in the gap; wherein a thin film having a high electric conductivity and exhibiting a property capable of moderating polarization of the orientation film at an interface with the liquid crystal, or a thin film having a low polarization is stacked on the above liquid crystal orientation film.

According to this liquid crystal element, since the thin film having a high electric conductivity and capable of moderating polarization of the orientation film at the interface with the liquid crystal is stacked on the liquid crystal orientation film, like the above-described liquid crystal element, it is possible to moderate polarization, particularly, electronic polarization of the orientation film at the interface with the liquid crystal and hence to improve an image quality and realize smooth display of a dynamic image irrespective of a material of the liquid crystal. Also, in the case where a high polymer thin film having low polarization is stacked on the liquid crystal orientation film, it is possible to reduce the after-image phenomenon. The high polymer thin film having low polarization can be made from polyvinyl alcohol, polyvinyl acetate, polyacrylonitrile, polyethylene or polyisoprene.

In this case, the thin film having a high electric conductivity is preferably composed of an organic or inorganic thin film having an electric conductivity of 2.0 S/cm or less; or it is preferably composed of an organic or inorganic thin film having an electric conductivity of $1.2 \times 10^{-8}$ S/cm or more.

The present invention also provides a liquid crystal element including: a plurality of base bodies each having a liquid crystal orientation film, the base bodies being opposed to each other on the orientation film side with a specific gap put therebetween; and liquid crystal disposed in the gap; wherein an organic complex having an electric conductivity of $1.2 \times 10^{-8}$ S/cm or more is stacked on the above liquid crystal orientation film.

According to this liquid crystal element, since the organic complex having an electric conductivity of $1.2 \times 10^{-8}$ S/cm or more is stacked on the liquid crystal orientation film, like the above liquid crystal element, it is possible to moderate polarization, particularly, electronic polarization of the orientation film at the interface with the liquid crystal and hence to improve an image quality and realize smooth display of a dynamic image irrespective to a material of the liquid crystal.

As the above organic complex, there may be used a complex compound of a material A and a material B. The material A may be selected from tetrathiafulvalene, dimethyl-tetrathiafulvalene, tetramethyl-tetrathiafulvalene, hexamethylene-tetrathiafulvalene, tetraselenofulvalene, tetrathiotetracene, quinoline, and the like; and the material B may be selected from tetracyanoquinodimethane, tetrafluoro-tetracyanoquinodimethane, methyl-tetracyanoquin odimethane, dimethyl-tetra-cyanoquinodimethane, dimethyl-tetracyano-quinodimethane, chlorotetracyanoquinodimethane, bromo-tetracyanoquinodimethane, and the like.

In this way, according to the liquid crystal element of the present invention, since the hysteresis caused by polarization of the orientation film at the interface with the liquid crystal can be eliminated, it is possible to reduce a value of a data voltage inputted from the column electrode side of a simple matrix and obtain smooth display of a dynamic image in a usual ferroelectric liquid crystal display, and it is possible to realize a perfect analog gradation display in the ferroelectric liquid crystal element of a type containing ultra-fine particles as disclosed in the earlier invention.

From the viewpoint of gradation, like the above-described earlier invention, domains different in threshold voltage for switching ferroelectric liquid crystal are preferably finely distributed. To form such micro-domains different in threshold voltage in ferroelectric liquid crystal, fine particles may be added into the ferroelectric liquid crystal.

Here, the above expression "domains different in threshold voltage are finely distributed" means that when the transmittance due to reversed domains (for example, black domains in white, or vice vasa) is 25%, 300 pieces or more (preferably, 600 pieces or more) of micro-domains each having a size of 1 $\mu$m$\phi$ or more are present in the visual field of 1 mm$^2$ and a threshold voltage width in the domains is 1 V or more, preferably, 2 V or more in a transmittance range of 10 to 90%.

Figure 18:
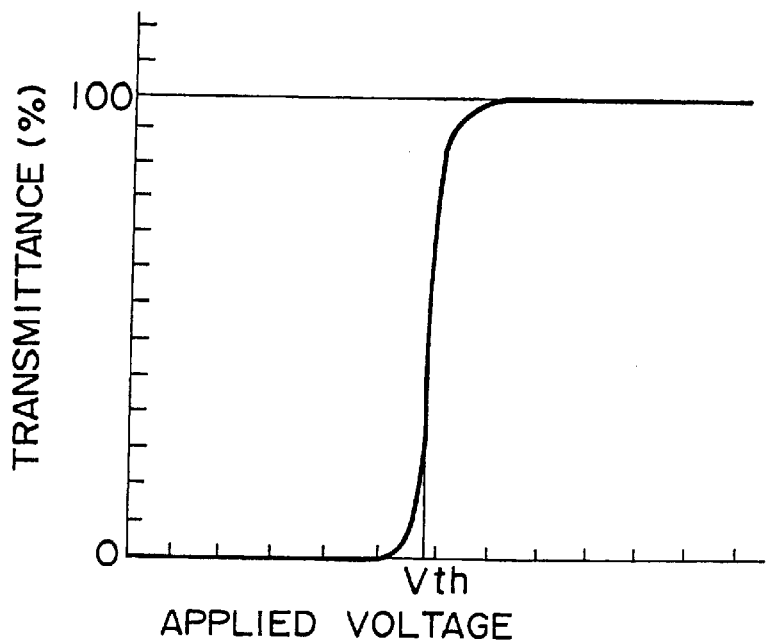
FIG. 18 is a graph of a transmittance-applied voltage characteristic showing a threshold voltage characteristic of a related art liquid crystal display element.
Figure 19:
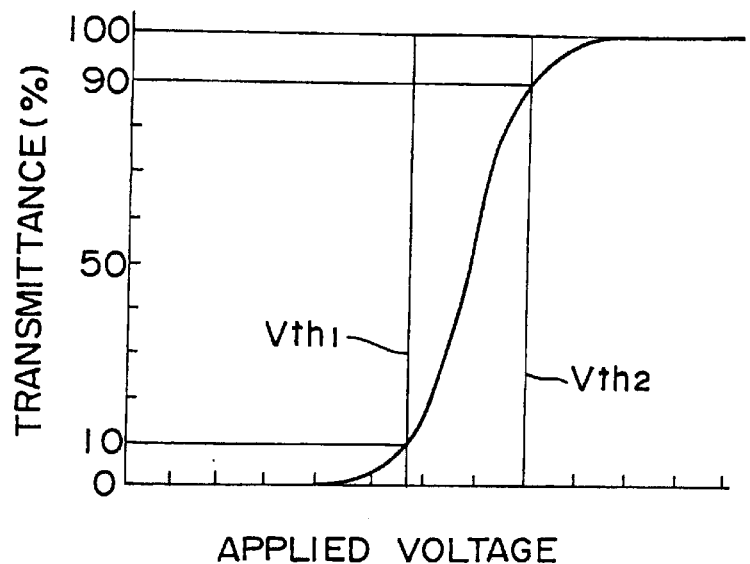
FIG. 19 is a graph of a transmittance-applied voltage characteristic showing a threshold voltage characteristic in an earlier invention.

Accordingly, as shown in FIG. 19, the transmittance of this liquid crystal element is not rapidly changed as shown in FIG. 18 but is relatively moderately changed depending on an applied voltage. The reason for this is that, as described above, particularly, micro-domains different in threshold voltage ($V_{th}$) appear in one pixel, and the transmittances of the micro-domains are individually changed depending on magnitudes of an applied voltage. Further, since bi-stable molecules of the liquid crystal have a memory function in one domain and one pixel is formed of these domains (in the order of μm) different in threshold voltage, it is possible to achieve continuous gradation display.

In FIG. 19, of values of the threshold voltage by means of which the transmittance is changed, a value giving a transmittance of 10% is taken as $V_{th1}$ and a value giving a transmittance of 90% is taken as $V_{th2}$, and in this case, a variable width of the threshold value ($\Delta V_{th} = V_{th2} - V_{th1}$) is 1 V or more.

With respect to the micro-domains, as shown in FIG. 6A, domains MD each having a size of 1 μmφ or more are present at a density of 300 pieces/mm² for the transmittance of 25%. The fine light transmission portions composed of these micro-domains can realize a screen of a middle gradation (transmittance) as a whole. The structure containing such micro-domains exhibits a starry sky, and therefore, it is referred to as "a starlight texture" hereinafter.

With this starlight texture, the light transmission portion MD composed of the micro-domain can be enlarged (to increase transmittance) or reduced (to decrease transmittance) as shown by a chain line of FIG. 6A depending on a magnitude of an applied voltage, to thereby arbitrarily change the transmittance depending on the applied voltage. On the contrary, in the element shown in FIGS. 15 and 16, as shown in FIG. 6B, since the threshold voltage width is significantly small, a light transmission portion D is rapidly increased or extinguished depending on an applied voltage, thereby making it difficult to achieve gradation display.

In the method of manufacturing this liquid crystal element, the above-described micro-domains can be formed by dispersing fine particles (or ultra-fine particles) in liquid crystal 5 in a liquid crystal cell.

Figure 7:
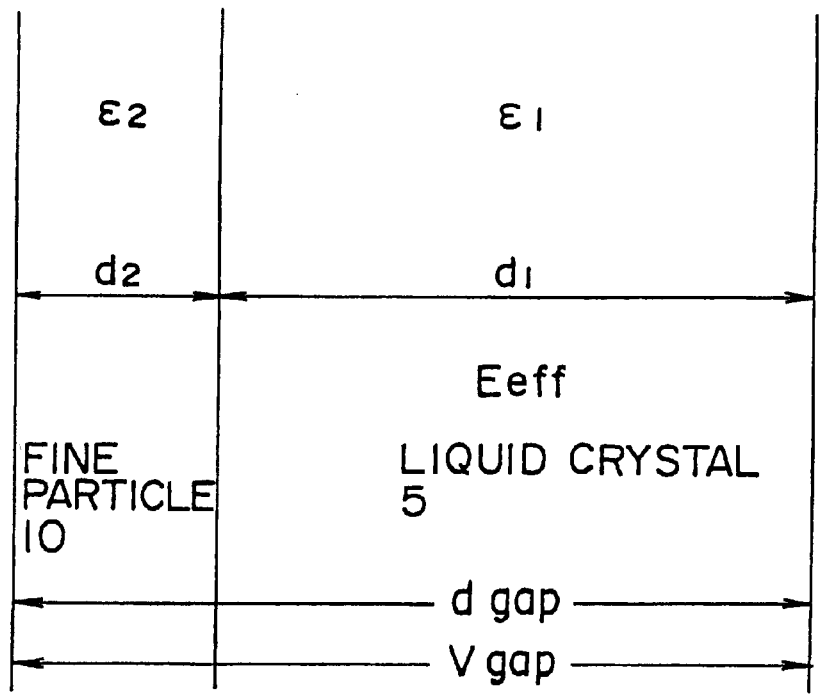
FIG. 7 is a theoretical diagram illustrating a change in threshold voltage of the liquid crystal element in the example.

Here, a change in threshold voltage due to ultra-fine particles will be theoretically described with reference to FIG. 7. Letting $d_2$ be a particle size of a ultra-fine particle 10, $\epsilon_2$ be a dielectric constant of the ultra-fine particle 10, $d_1$ be a thickness of liquid crystal 5 excluding the ultra-fine particle 10, and $\epsilon_1$ be a dielectric constant of the liquid crystal 5, an electric field $E_{eff}$ applied to the liquid crystal 5 is expressed by the following equation (1):

$$E_{eff} = (\epsilon_2/(\epsilon_1 d_2 + \epsilon_2 d_1)) \times V_{gap} \quad (1)$$

Accordingly, in the case where the ultra-fine particle 10 having the dielectric constant $\epsilon_2$ lower than that ($\epsilon_1$) of the liquid crystal 5 is added to the liquid crystal 5 ($\epsilon_2 < \epsilon_1$), since the ultra-fine particle 10 having the diameter ($d_2$) smaller than the total thickness $d_{gap}$ (=$d_1+d_2$) of the liquid crystal 5 is contained in the liquid crystal 5, the following equation is given:

$$E_{eff} < E_{gap}$$

That is, the electric field $E_{eff}$ smaller than $E_{gap}$ (in the case containing no fine particle) is applied to the liquid crystal 5.

On the contrary, in the case where the ultra-fine particle 10 having the dielectric constant ($\epsilon_2$) larger than that ($\epsilon_1$) of the liquid crystal 5 is added to the liquid crystal 5 ($\epsilon_2 > \epsilon_1$), the following equation is given:

$$E_{eff} > E_{gap}$$

That is, the electric field $E_{eff}$ larger than $E_{gap}$ (in the case containing no fine particle) is applied to the liquid crystal 5.

The above results can be summarized as follows:

$$\epsilon_1 > \epsilon_2 \rightarrow E_{eff} < \{V_{gap}/(d_1+d_2)\} = V_{gap}/d_{gap} = E_{gap}$$

$$\epsilon_1 = \epsilon_2 \rightarrow E_{eff} = E_{gap}$$

$$\epsilon_1 < \epsilon_2 \rightarrow E_{eff} > E_{gap}$$

In each case, the effective field $E_{eff}$ applied to liquid crystal is changed by addition of a ultra-fine particle in the liquid crystal, and the effective field applied to the liquid crystal differs between a region in which the ultra-fine particle is present and a region in which it is not present. As a result, even when the same electric field $E_{gap}$ is applied, there exist a region in which a reversed domain is generated and a region in which it is not generated. Thus, there appears the starlight texture structure shown in FIG. 6A.

From the above description, it becomes apparent that the micro-domain texture structure is suitable for realization of a continuous gradation display and that various transmittances, that is, two kinds or more of gradation levels can be obtained by controlling an applied voltage (magnitude, pulse width, and the like) to liquid crystal added with ultra-fine particles as described above, that is, applying two kinds or more of voltages to the liquid crystal. On the contrary, only by addition of fine particles in liquid crystal, the liquid crystal obtains only a structure shown in FIG. 6B. In particular, it is apparent that the desired display characteristic cannot be obtained even by addition of fine particles each having a particle size of 0.3 to 2 μm with fine gaps (about 2 μm), and in this case, there occurs unevenness in color not only by the presence of the fine gaps but also by the presence of the fine particle portions.

Figure 15:
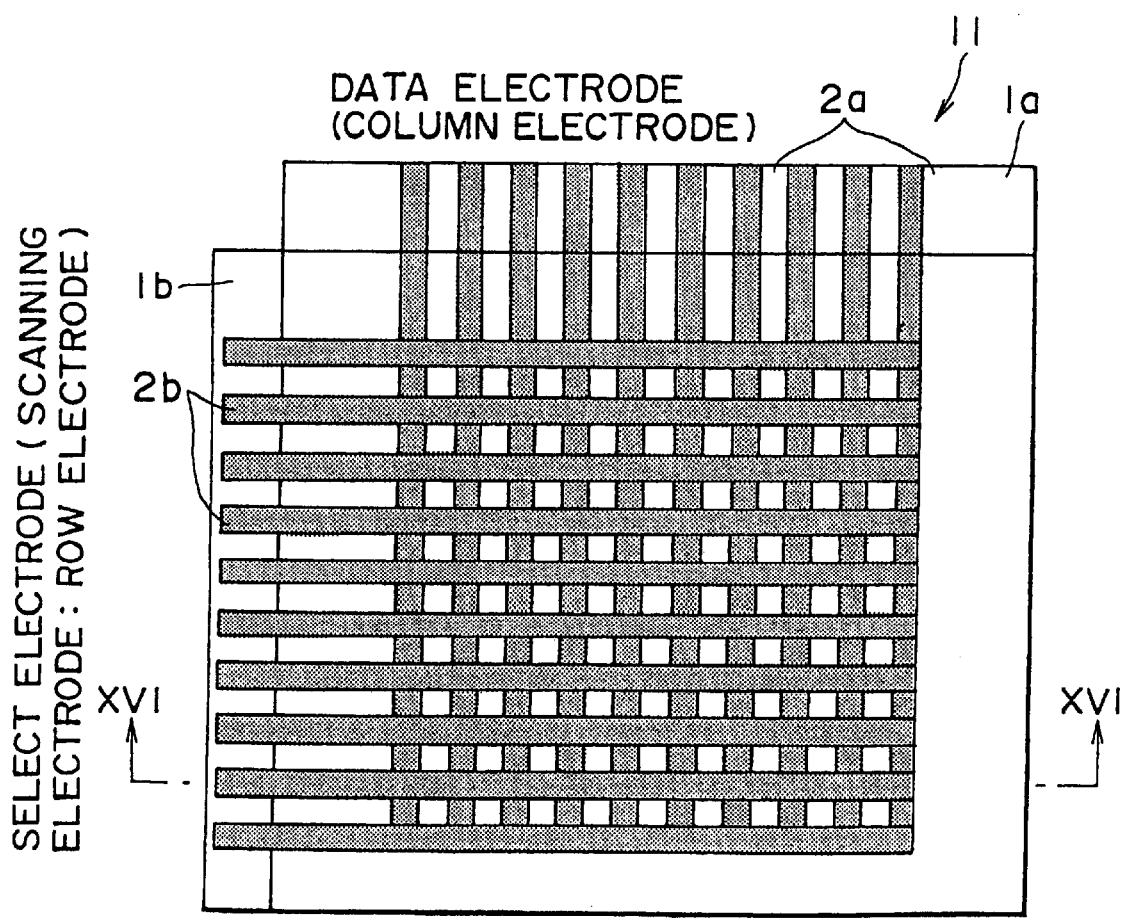
FIG. 15 is a schematic plan view, seen from a select electrode side, of a related art liquid crystal display element.
Figure 16:
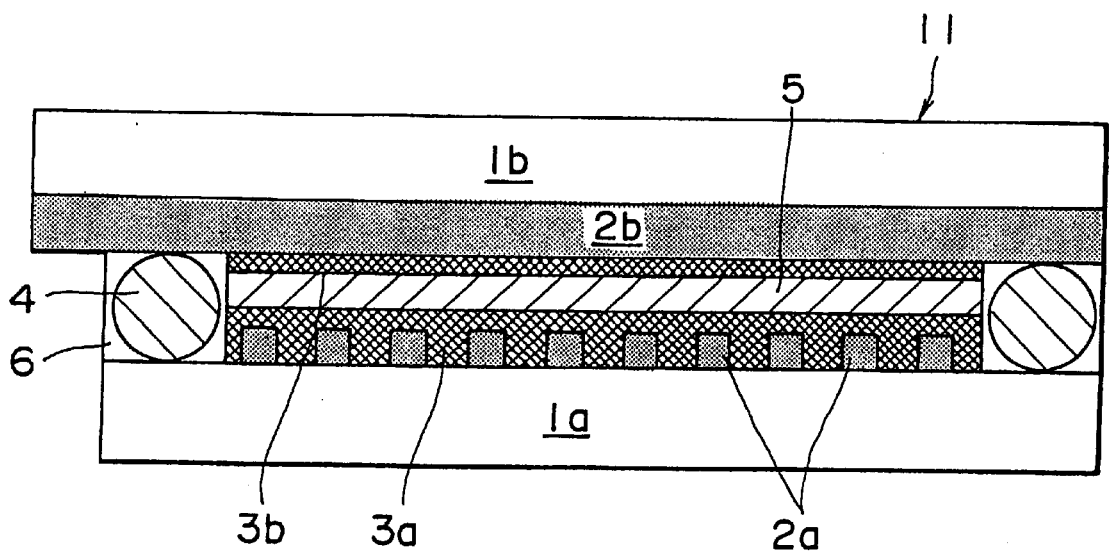
FIG. 16 is a sectional view taken on line XVI—XVI of FIG. 15.
Figure 17:
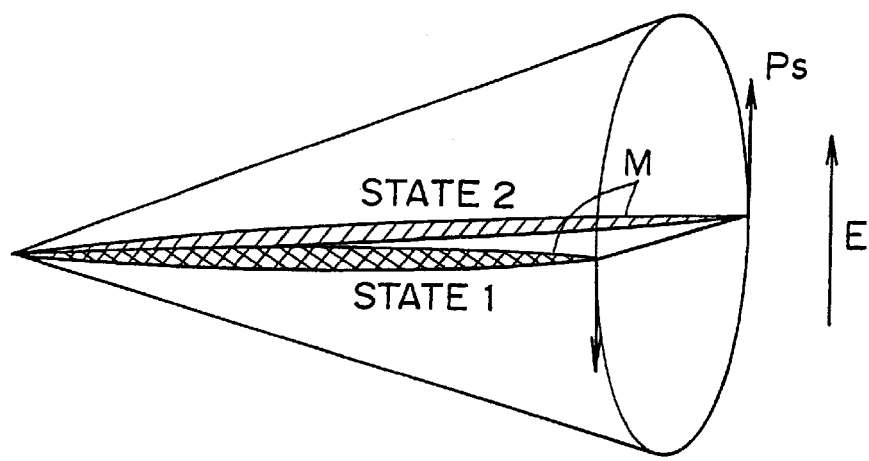
FIG. 17 is a view showing a model of ferroelectric liquid crystal.

According to the liquid crystal element of the present invention, as the above fine particles to be added in liquid crystal, there may be used fine particles capable of giving a distribution of an effective electric field strength applied to the liquid crystal 5 present between the opposed transparent electrode layers 2a and 2b shown in FIGS. 15 and 16. For example, there may be used a mixture of fine particles of a plurality of materials different in dielectric constant. The presence of such a mixture of the fine particles different in dielectric constant is effective to form a distribution of dielectric constants in each pixel.

Consequently, as described above, even when an external electric field is uniformly applied between the transparent electrode layers 2a and 2b in one pixel, a distribution of an effective electric field strength applied to liquid crystal in the pixel is given, to extend a width of a distribution of threshold voltages for switching states of liquid crystal (particularly, ferroelectric liquid crystal) between bi-stable states, thereby allowing an analog gradation display in one pixel.

In the case of using fine particles having the same dielectric constant, sizes of the fine particles may be distributed. By the presence of the fine particles being not different in dielectric constant but different in size, the thickness of the liquid crystal layer can be distributed. As a result, even when an external electric field is uniformly applied between the transparent electrode layers 2a and 2b in one pixel, an effective electric field strength applied to the liquid crystal in the pixel, to thereby allow an analog gradation display in the pixel. It is desired to make large the distribution of sizes of fine particles to some extent for realizing an excellent analog gradation display.

In the liquid crystal element of the present invention, fine particles to be added in liquid crystal preferably have surfaces having pH=2.0 or more. This is because, the surfaces of the fine-particles having pH=less than 2.0 are stronger in acidity, and accordingly, the liquid crystal is liable to be deteriorated by protons.

The added amount of the fine particles usable in the present invention is not particularly limited, and can be suitably determined in consideration of a desired analog gradation display. In general, the fine particles are preferably added in liquid crystal in an amount of 0.0001 wt % to 50 wt %. When the added amount of the fine particles is excessively large, the fine particles are possibly aggregated. This makes it difficult to realize the micro-domain texture structure and to inject liquid crystal.

The fine particles usable in the present invention may be made from carbon black, particularly, carbon black prepared by a furnace process and/or titanium oxide, particularly, amorphous titanium oxide. Pyrolytic carbon black prepared by the furnace process has a relatively wide distribution of sizes of fine particles, and amorphous titanium oxide has a good surface characteristic and has an excellent durability.

The size of each of the fine particles usable in the present invention is preferably less than a half of a gap of a liquid crystal cell, that is, less than 0.4 $\mu$m, particularly, less than 0.1 $\mu$m, in a state of the primary particles not aggregated. The shape of each of the fine particles is preferably spherical in terms of ease of control of the fine particles. The distribution of sizes of the fine particles, which allows control of the gradation display characteristic, has preferably a standard deviation of 9.0 nm or more in terms of moderation of a change in transmittance. Further, a specific gravity of each fine particle is preferably 0.1 to 10 times that of the liquid crystal in terms of prevention of sedimentation upon dispersion of the fine particles in the liquid crystal. Additionally, the fine particles may be subjected to surface treatment using a silane coupling agent or the like for improving dispersibility of the fine particles.

As described above, the sizes of the above fine particles are extremely small, and therefore, they may be called "ultra-fine particles".

According to the present invention, fine particles are preferably present in liquid crystal between opposed electrodes, and further, they may be present in or on a liquid crystal orientation film. The structure of the liquid crystal element of the present invention except that fine particles are present between opposed electrodes may be the same as that of the liquid crystal element (particularly, ferroelectric liquid crystal element) shown in FIGS. 15 and 16.

For example, in the liquid crystal element of the present invention, the substrate may be formed of a transparent glass substrate; the electrode layer may be made from ITO (Indium Tin Oxide) or the like; and the liquid crystal orientation film may be formed of a polyimide film subjected to a rubbing treatment or a SiO oblique vapor-deposition film. The drive system is based on a manner of the present invention, and it is to be noted that since the gray level using the starlight texture of micro-domains is obtained by changing a voltage of a data pulse like the manner described above, the data pulse is usually applied over the whole of one frame.

Figure 8A:
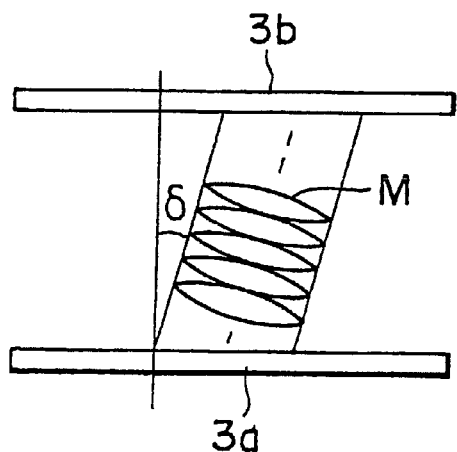
FIGS. 8A to 8C, is a schematic diagram showing a relationship between a layer tilt angle of ferroelectric liquid crystal and an effective spontaneous polarization for the liquid crystal element in the example.
Figure 8B:
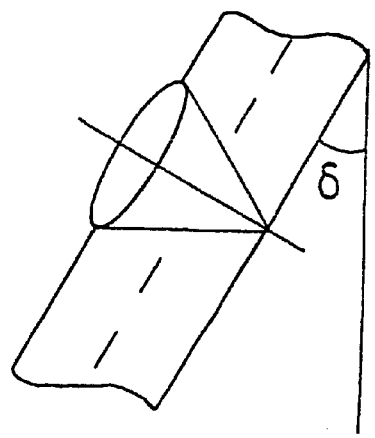
Figure 8C:
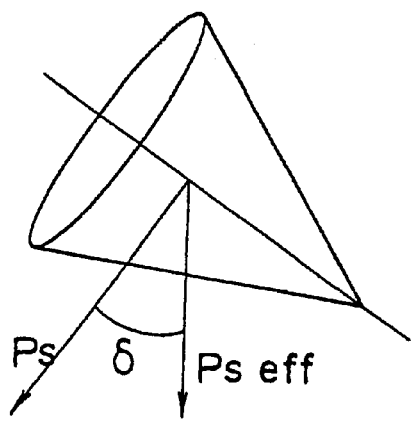

Further, gradation can be obtained by giving a distribution of a layer tilt angle of the liquid crystal. To be more specific, by the presence of ultra-fine particles themselves, a distribution of the layer tilt angle (indicated by character δ in FIGS. 8A to 8C) of liquid crystal, that is, a distribution of an effective spontaneous polarization $Ps_{eff}$ (characteristic value determining a threshold value of ferroelectric liquid crystal FIG. 8C) can be given irrespective of the characteristics thereof, so that a large number of domains having various threshold values are present in one pixel. With respect to sizes of domains, it is known that ultra-fine particles of the order of a nanometer are extremely small in size, and accordingly, they have an effect (pinning effect) of cutting continuity of layers near the particles, thereby preventing extension of domains. Fine particles of the order of submicron little exhibit such a pinning effect, and in the case of exhibiting the effect, the presence thereof becomes large defense and significantly exerts adverse effect on transmittance.

In addition, as ferroelectric liquid crystal usable in the present invention, there is preferably used a mixture of chiral smectic C (SmC*) liquid crystal and non-chiral smectic C (SmC) liquid crystal. As each of chiral smectic C (SmC*), liquid crystal and non-chiral smectic C (SmC) liquid crystal, there may be used one kind or a mixture of a plurality of kinds.

As the chiral smectic C (SmC*) liquid crystal (ferroelectric liquid crystal), there may be used the known liquid crystal such as a pyrimidine based liquid crystal, biphenyl based liquid crystal or phenylbenzoate based liquid crystal (however, such a ferroelectric liquid crystal occasionally exhibits a chiral nematic phase or a smectic a phase, depending on a change in temperature).

The present invention will be more clearly understood by way of the following examples:

EXAMPLE 1

First, a transparent ITO film (surface resistance: 100 $\Omega/cm^2$) having a thickness of 40 nm was formed on a glass substrate by sputtering. Next, a SiOx oblique vapor-deposition film 3 (thickness: 50 nm) having SiOx pillars 20 shown in FIG. 5 was vapor-deposited as a liquid crystal orientation film on the transparent ITO film of the glass substrate, using a deposition source composed of a powder of SiO (purity: 99.99%, produced by Furuuchi Kagaku Co., Ltd.) put in a tantalum boat (produced by Nihon Backsmetal Co., Ltd.) and heated by resistance heating. In this vapor-deposition, the substrate was disposed obliquely downward from the deposition source, and a deposition angle between the normal line of the substrate and a line connecting the deposition source to the substrate was set at 85°. To obtain a good orientation characteristic, after vapor-deposition, the orientation film formed on the ITO film of the substrate was baked in air at 200° C. for 1 hr.

In order to examine a relationship between an electric conductivity at a liquid crystal-orientation film interface and electronic polarization, the electric conductivity of the orientation film was changed by varying the baking temperature, that is, changing a value of x of SiOx. A relationship between the baking temperature and a bond energy of a 2P orbital of Si is shown in FIG. 1.

The two glass substrates thus prepared were assembled using spacers each having a diameter of 1.6 $\mu$m shinshikyu, produced by Catalysts & Chemicals Industries Co., Ltd.) and an ultraviolet ray hardened type adhesive (Photolec, produced by Sekisui Chemical Co., Ltd.) in such a manner that the deposition directions of the opposed SiO oblique vapor-deposition films are anti-parallel to each other, to form an empty liquid crystal cell. Then, a ferroelectric liquid crystal (YS-C152, produced by Chisso Corporation) in which titanium oxide (IT-S, produced by Idemitsu Kosan Co., Ltd.) was homogeneously dispersed in an amount of 2 wt % was injected in a gap of the cell, to obtain a liquid crystal display element (liquid crystal panel) similar to that shown in FIGS. 15 and 16. The element has a configuration similar to that in the above-described earlier invention, and therefore, the detailed description thereof is omitted.

Figure 2:
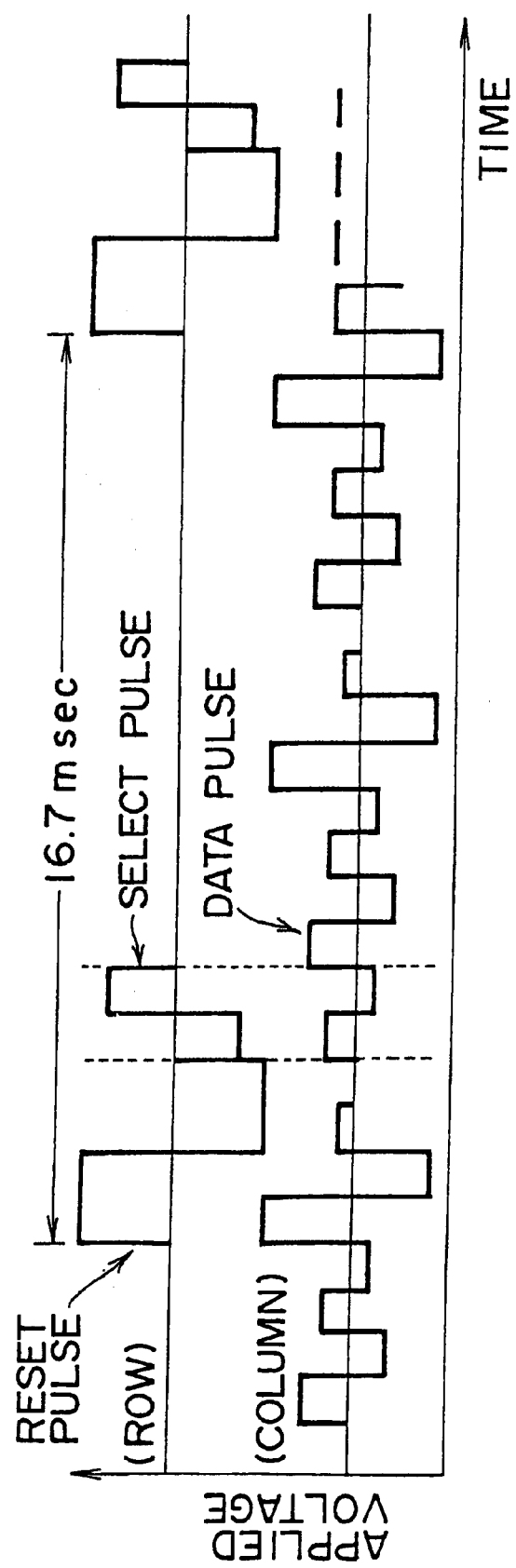
FIG. 2 is a diagram showing a waveform for driving the liquid crystal element in the example.

With respect to the liquid crystal display element thus obtained, a relationship between an applied voltage and a transmittance was examined. A drive waveform shown in FIG. 2 was applied to the liquid crystal display element between polarizers, and a light transmission intensity was monitored.

Figure 3:
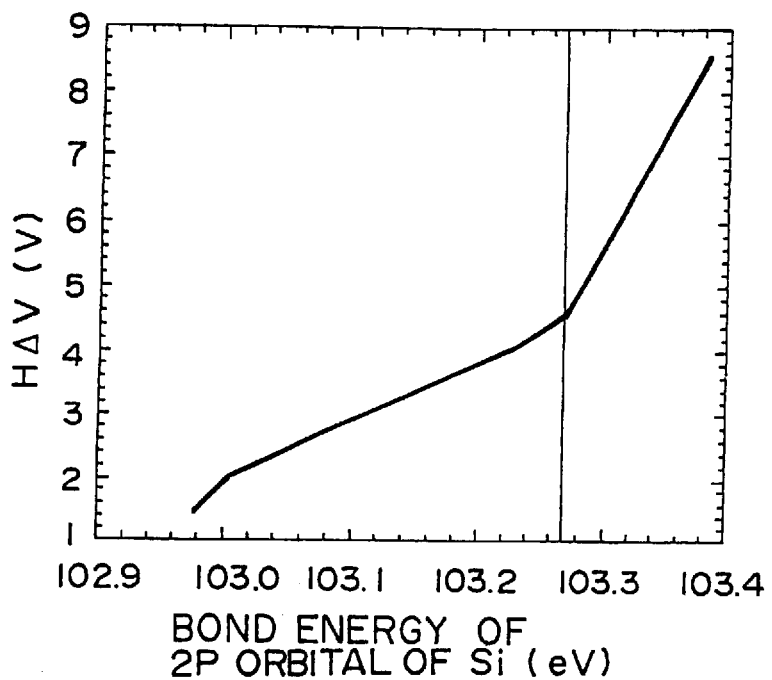
FIG. 3 is a graph showing a relationship between a bond energy of a 2P orbital of Si and a hysteresis for the SiO oblique vapor-deposition film in the example.
Figure 4:
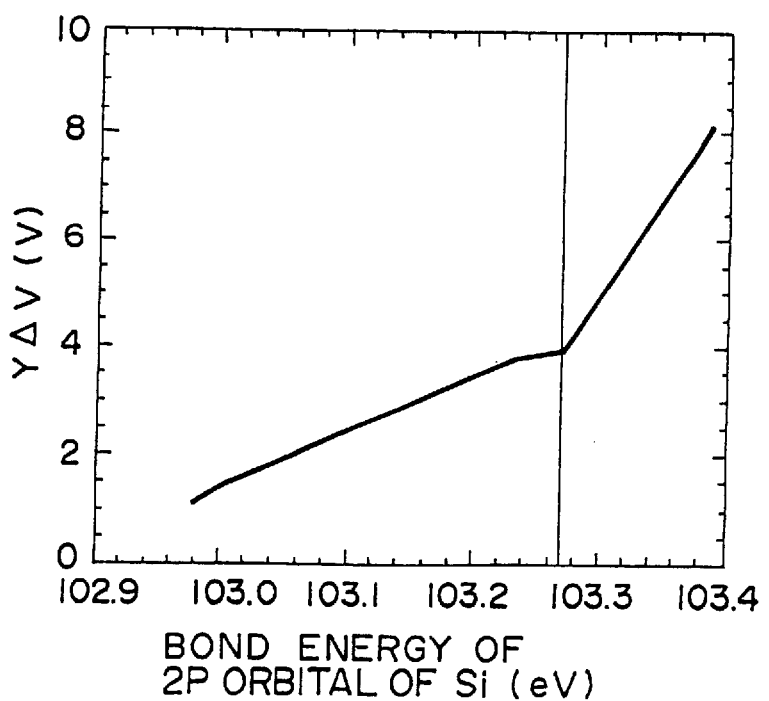
FIG. 4 is a graph showing a bond energy of a 2P orbital of Si and an after-image for the SiO oblique vapor-deposition film in the example.
Figure 20:
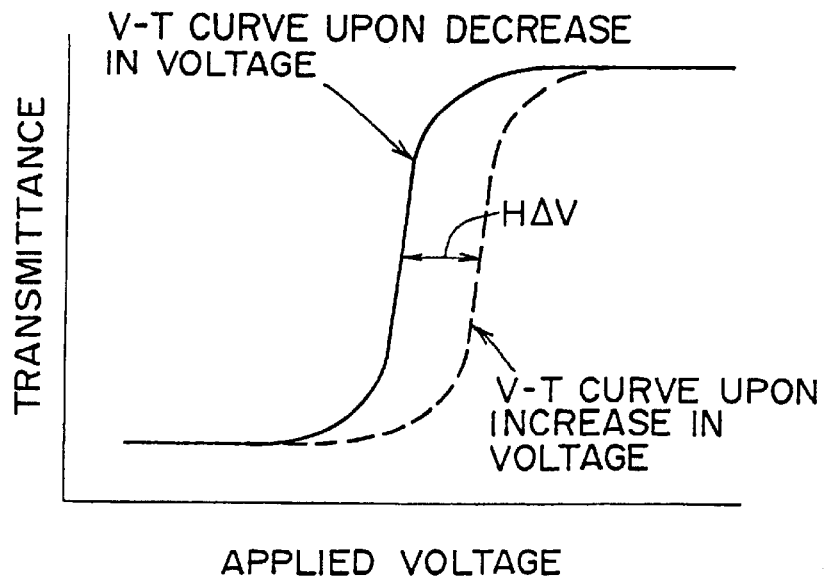
FIG. 20 is a graph of a general characteristic (particularly, hysteresis) showing a relationship between an applied voltage and a transmittance in a liquid crystal display element.
Figure 21:
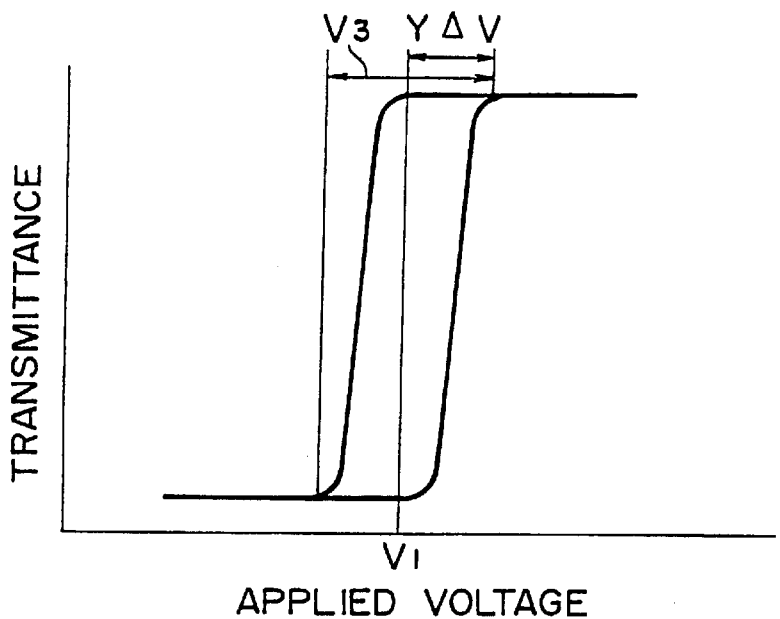
FIG. 21 is a graph of a general characteristic (particularly, after-image) showing a relationship between an applied voltage and a transmittance in a liquid crystal display element.
Figure 22:
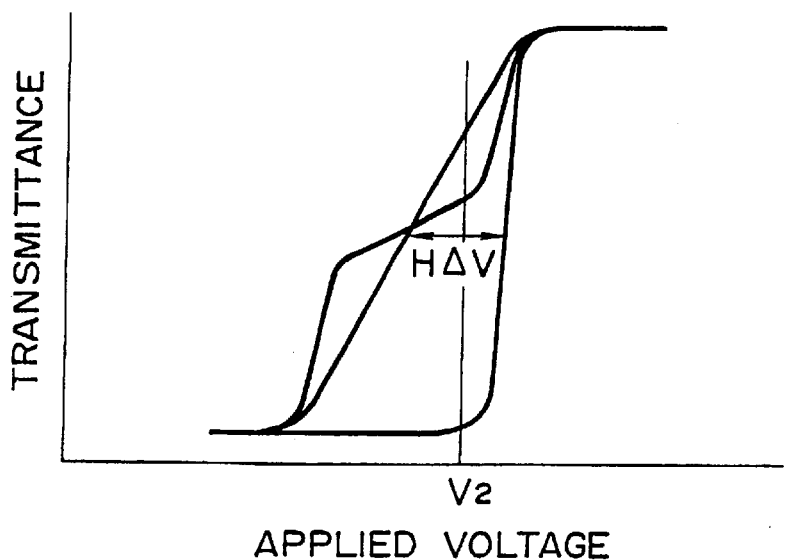
FIG. 22 is a graph showing a model of a change in an applied voltage-transmittance curve due to an after-image in a liquid crystal display element.

On the basis of applied voltage-transmittance curves thus measured, there were obtained a relationship between a HΔV as shown in FIG. 20 and a bond energy of a 2P orbital of Si (see FIG. 3), and a relationship between a YΔV as shown in FIG. 21 and a bond energy of a 2P orbital of Si (see FIG. 4).

As is apparent from these results shown in FIGS. 3 and 4, both the HΔV and YΔV are sufficiently reduced in a range in which the bond energy is 103.3 eV or less (particularly, 103.27 eV or less), and both the HΔV and YΔV are rapidly increased in a range in which the bond energy is more than 103.3 eV (particularly, more than 103.27 eV).

By making small the HΔV and YΔV as described above, it is possible to reduce a value of a data voltage inputted from the column side of a simple matrix and realize smooth display of a dynamic image in a usual ferroelectric liquid crystal display, and it is possible to attain a perfect analog gradation display in a ferroelectric liquid crystal element of a type containing ultra-fine particles as in this example.

Accordingly, it becomes apparent that electronic polarization of the orientation film at an interface with the liquid crystal can be moderated by use of the SiOx oblique vapor-deposition film in which the bond energy of a 2P orbital of Si is 103.3 eV or less. In such a SiOx oblique vapor-deposition film is low in polarization; has the bond energy of 103.3 eV or less; and is deficient in oxygen and more active as compared with $SiO_2$ having the above bond energy of 103.4 eV. And, the electric conductivity of SiOx tends to become higher as the baking temperature shown in FIG. 1 becomes lower (that is, SiOx becomes more deficient in oxygen).

In addition, the bond energy of a 2P orbital can be measured by ESCA (Electron Spectroscopy for Chemical Analysis, that is, XPS (X-ray Photoelectron Spectroscopy) which is one kind of electron spectroscopy.

EXAMPLE 2

Figure 10:
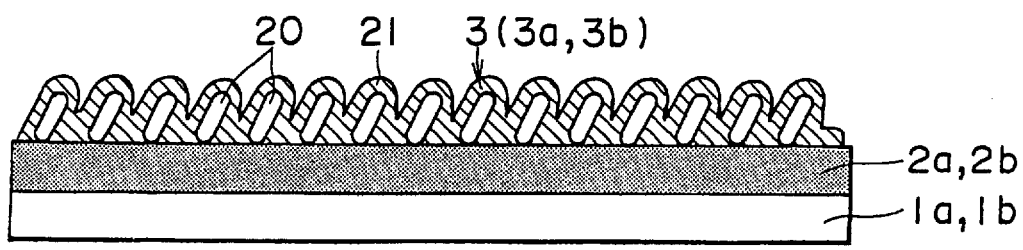
FIG. 10 is a schematic sectional view showing an essential portion of the liquid crystal element in the example shown in FIG. 9.

In a liquid crystal panel prepared in the same manner as in Example, as shown in FIG. 10, a high polymer film 21 (electric conductivity: 2.0 S/cm or less, $1.2 \times 10^{-8}$ S/cm) considered to be lower in polarization than a SiO oblique vapor-deposition film was stacked on a SiO oblique vapor-deposition film 3 as a liquid crystal orientation film in the following procedure.

The high polymer 21 was made from polyvinyl alcohol (number of molecules: 13,000). Polyvinyl alcohol is an organic matter used for a rubbing orientation film capable of obtaining a high orientation irrespective of the kind of liquid crystal. It is reported that a rubbing orientation film made from polyvinyl alcohol little exhibits an applied voltage-transmittance hysteresis; however, it has a disadvantage that the surface shape of the film after rubbing is unstable and the orientation characteristic is not specified. The rubbing orientation film made from polyvinyl alcohol, therefore, cannot be practically used.

If polyvinyl alcohol exhibiting no hysteresis is stacked on an orientation film, the orientation film thus stacked with polyvinyl alcohol is expected to be small in polarization. From this viewpoint, first, there were prepared three kinds of solutions of polyvinyl alcohol diluted in water as a solvent at three kinds of concentrations. Each solution of polyvinyl alcohol was then spin-coated on the SiO oblique vapor-deposition film using a spiner at a rotational speed of 500 rpm (after 4 sec) and at a rotational speed of 3,500 rpm for 10 sec, followed by baking in a clean oven at 110° C. for 60 min, to form an organic film on the SiO oblique vapor-deposition film.

Figure 9:
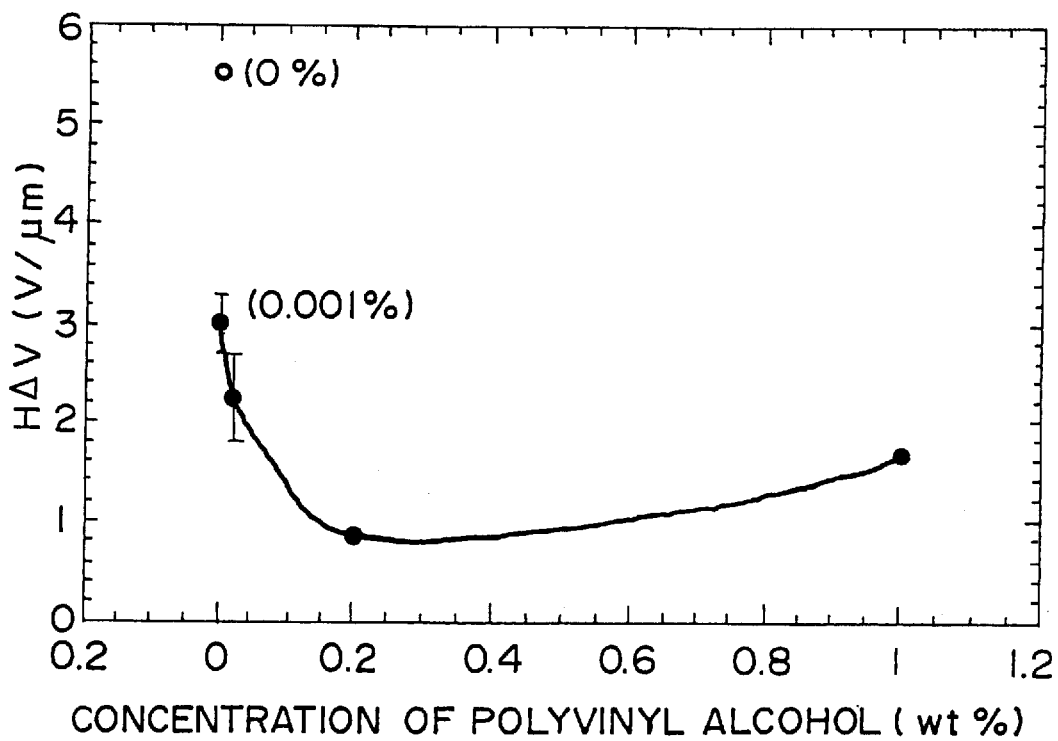
FIG. 9 is a graph showing a relationship between a concentration of a solution of polyvinyl alcohol upon formation of a polyvinyl alcohol thin film stacked on a SiO oblique vapor-deposition orientation film and a hysteresis for a liquid crystal element according to another example of the present invention.

FIG. 9 shows a relationship between a concentration of the solution of the high polymer compound (polyvinyl alcohol) upon spin-coating and a hysteresis (HΔV) upon drive of the liquid crystal panel using the SiO oblique vapor-deposition film stacked with the high polymer compound. From the results shown in FIG. 9, it becomes apparent that the film coated with the solution of polyvinyl alcohol at a concentration of 1 wt % is somewhat degraded in orientation characteristic and is somewhat increased in hysteresis because the film thickness becomes thick and thereby the orientation restricting force of polyvinyl alcohol becomes weak by planarization of the surface of the SiO oblique vapor-deposition film; however, the film coated with the solution of polyvinyl alcohol at a concentration of 0.2 wt % can be improved such that the hysteresis is reduced to a value being one-seventh that of the film with no polyvinyl alcohol (data shown by a white circle mark in FIG. 9). In addition, to suppress the hysteresis at a low value, the concentration of the solution of polyvinyl alcohol may be in a range of 0.05 to 1.0 wt %, further, in a range of 0.1 to 0.8 wt %, preferably, in a range of 0.15 to 0.6 wt %, more preferably, 0.2 to 0.3 wt %.

EXAMPLE 3

Figure 13A:
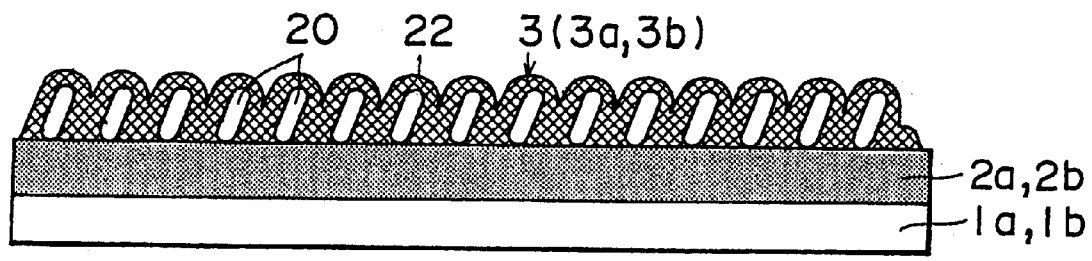
FIG. 13A is a schematic sectional view showing an essential portion of the liquid crystal element in the example shown in FIG. 9

In a liquid crystal panel prepared in the same manner as in Example 1, as shown in FIG. 13A, an organic complex 22 having an electric conductivity ($1.2 \times 10^{-8}$ S/cm or more) considered to be higher than that of a SiO oblique vapor-deposition film 3 as an orientation film was stacked on the SiO vapor-deposition film 3 in the following procedure.

As the organic complex 22, there was used a (TTF-TCNQ) complex of tetrathiafluvalene (TTF) and tetracyanoquinodimethane (TCNQ). The (TTF-TCNQ) complex is a single crystal having an electric conductivity of $1 \times 10^2$ S/cm. It is known that formation of the (TTF-TCNQ) complex on a SiO oblique vapor-deposition film is effective to improve an electro-optic characteristic such as speed of response [E. Matsui et al. "Enhancement of FLC Switching Properties Using SiO Alignment Layers Combined with Charge-Transfer Complexes", Ferroelectrics. Vol. 149, pp. 97–107 (1993)].

The (TTF-TCNQ) complex was prepared by mixing TTF with TCNQ at a mixing ratio of 50 wt % in acetonitrile, followed by filtering, and drying the mixture in a vacuum oven. Using a deposition source composed of the mixture of TTF and TNCQ put in a vapor-deposition boat, the (TTN-TCNQ) complex was vapor-deposited on the orientation film at a substrate temperature set at room temperature. In this deposition, the vapor-deposition source was disposed upward from the substrate in such a manner as to be apart a distance of 30 cm from the substrate, and a deposition angle between the normal line of the substrate and a line connecting the vapor-deposition source to the substrate was set at 0°. The deposition was repeated while the thickness of the (TTN-TCNQ) complex film was changed. The orientation film stacked with the (TTF-TCNQ) complex was then baked in air at 100° C. for 30 min.

Figure 13B:
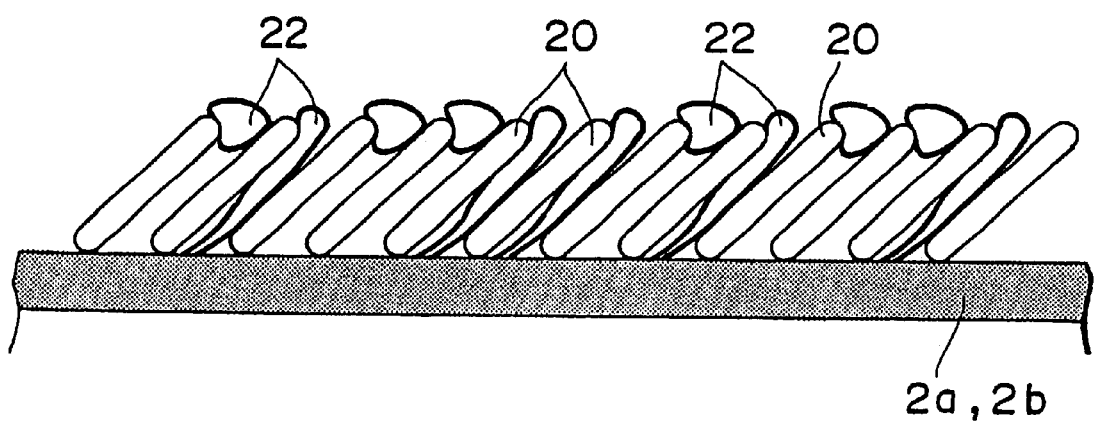
FIG. 13B is an enlarged view showing a portion in FIG. 13A.
Figure 14:
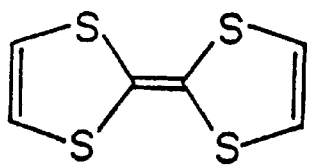
FIG. 14 is a diagram showing structural chemical formula of each of TTF and TCNQ.
Figure 14:
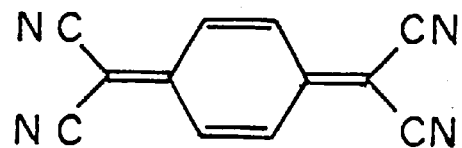

As shown in an enlarged view of FIG. 13B, the (TTF–TCNQ) organic complex 22 thus formed on the SiO vapor-deposition film 3 is actually formed in a state in which it is not only stacked on upper surfaces of SiO pillars 20 but also put between particles. In the state in which the complex 22 is put between the SiO pillars 20, electric charges flow in the b-axis direction (length direction) of the SiO pillars 20 by the electric conductivity of the complex 22, and are easy to be discharged on the electrodes 2a or 2b side, thus reducing or eliminating electronic polarization liable to be generated at the interface with the liquid crystal.

The adhesion of the organic complex 22 between the SiO pillars 20 can be confirmed by infrared absorption spectrum.

Figure 11:
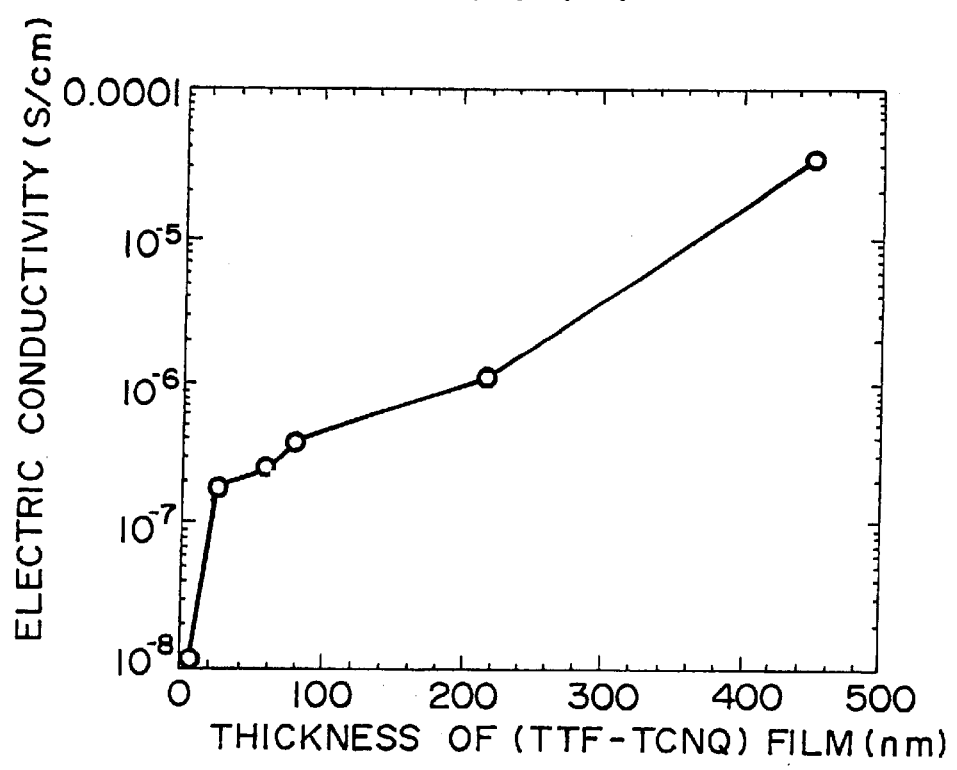
FIG. 11 is a graph showing a relationship between a thickness and an electric conductivity for a film of an organic complex composed of tetrathiafulvalene (TTF) and tetracyanoquinodimethane (TCNQ)

The electric conductivity of the organic complex film was measured. The results are shown in FIG. 11. As is apparent from this graph, the organic complex film having a film thickness of 5 nm exhibits the electric conductivity of $1.2 \times 10^{-8}$ S/cm. The thicker the film thickness of the organic complex film, the higher the electric conductivity thereof. Here, the term "film thickness" means a height from a lower surface (electrode surface) of the orientation film.

Figure 12:
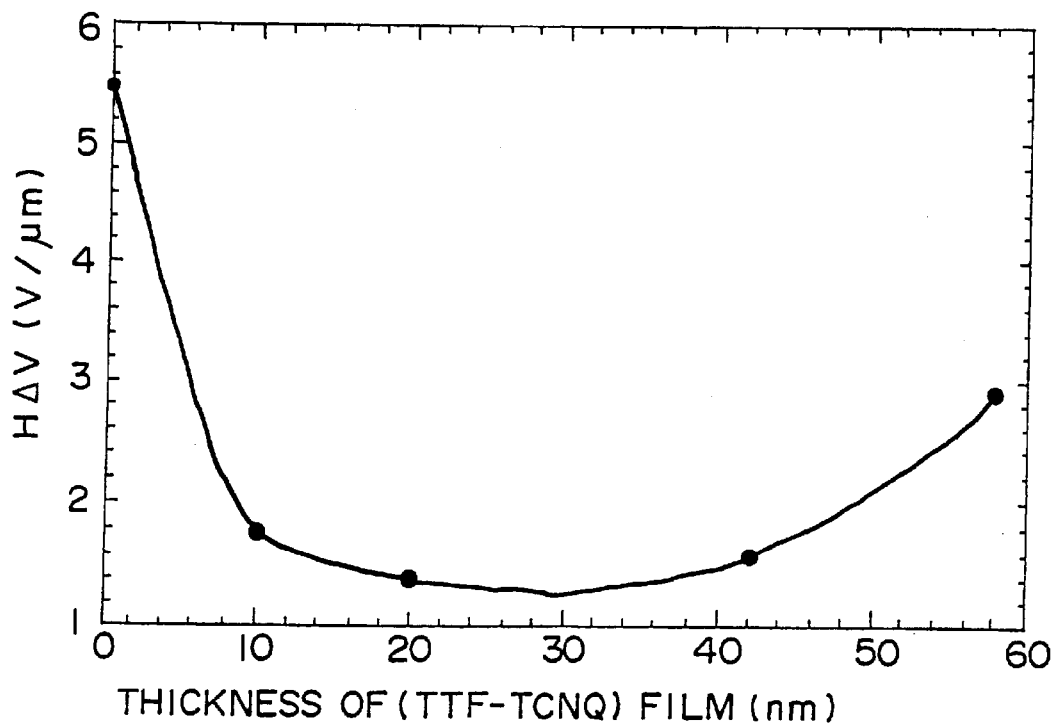
FIG. 12 is a graph showing a relationship between a thickness and a hysteresis for the film of the (TTF–TCNQ) complex.

As shown in FIG. 12, by formation of the (TTF–TCNQ) complex on the orientation film, the hysteresis upon drive of the liquid crystal panel is very improved. In particular, for the film on which the (TTF–TCNQ) complex film having a thickness of 5–50 nm is stacked, the hysteresis (H$\Delta$V) can be suppressed at a value being as small as about 2 V/$\mu$m or less.

While the present invention have been described by way of the examples, such description is for illustrative purposes only, and it is to be understood that changes and variations may be made under the technical thought of the present invention.

For example, the kind, combination, and formation method of the above liquid crystal orientation film, the organic or inorganic thin film or an organic complex film stacked on the liquid crystal orientation film are not limited to those described in the above examples, and further, the material and physical properties of the fine particles may be changed.

Further, although the transparent electrode is made from ITO in the above examples, it may be made from a material used for the known transparent electrode such as indiun tin.

The components of the liquid crystal element, for example, the transparent substrate, spacer, and sealer may be made from the known materials.

The above liquid crystal element of the present invention can be used for an optical shutter, light switch, and light blind, in addition to a display. Further, when combined with an electro-optic element or the like, the liquid crystal element of the present invention can be applied to a liquid crystal prism, liquid crystal lens, optical path change-over switch, light modulator, phase grating, A/D converter, and optical logic circuit.

What is claimed is:

1. A liquid crystal element comprising:
   a plurality of base bodies each having a liquid crystal orientation film, said base bodies being opposed to each other on the orientation film side with a specific gap put therebetween; and
   liquid crystal disposed in said gap;
   wherein each of said orientation films has a property capable of moderating polarization at an interface with said liquid crystal, and comprises an oblique vapor-deposition film of SiO$_x$, where x is a positive number less than 2, in which a bond energy of a 2P orbital of Si is 103.3 eV or less.

2. A liquid crystal element according to claim 1, wherein said liquid crystal orientation film comprises a stacked film in which a thin film having a property capable of moderating polarization at an interface with said liquid crystal is stacked on an orientation film.

3. A liquid crystal element according to claim 2, wherein said thin film capable of moderating polarization has an electric conductivity of 2.0 S/cm or less.

4. A liquid crystal element according to claim 2, wherein said thin film capable of moderating polarization has an electric conductivity of $1.2 \times 10^{-8}$ S/cm or more.

5. A liquid crystal element according to claim 1, wherein said liquid crystal comprises ferroelectric liquid crystal in which domains different in threshold voltage for switching said ferroelectric liquid crystal are finely distributed.

6. A liquid crystal element according to claim 5, wherein fine particles are added in said ferroelectric liquid crystal for forming micro-domains different in threshold voltage.

* * * * *